United States Patent [19]

Benson et al.

[11] Patent Number: 4,860,729
[45] Date of Patent: Aug. 29, 1989

[54] METHOD AND APPARATUS FOR NUCLEATING THE CRYSTALLIZATION OF UNDERCOOLED MATERIALS

[75] Inventors: David K. Benson, Golden, Colo.; Peter F. Barret, Peterbourgh, Canada

[73] Assignee: Midwest Research Institute

[21] Appl. No.: 154,364

[22] Filed: Feb. 10, 1988

[51] Int. Cl.⁴ ............................. F24H 7/00; F24J 1/00
[52] U.S. Cl. .................................... 126/400; 126/263; 165/10; 165/1
[58] Field of Search ............... 165/1, 10 A; 126/400, 126/204, 263; 122/21; 156/616.3, 624, DIG. 98; 422/245; 222/54

[56] References Cited

U.S. PATENT DOCUMENTS

| | | | |
|---|---|---|---|
| 708,549 | 9/1902 | Heiliger | 126/263 |
| 1,384,747 | 7/1921 | Eckelmann et al. | |
| 1,385,074 | 7/1921 | Ferguson | |
| 1,433,010 | 10/1922 | Hogan | 126/263 |
| 1,920,853 | 8/1933 | Ferguson | |
| 2,220,777 | 11/1940 | Othmer | 126/204 |
| 2,386,654 | 10/1945 | Caldwell | |
| 3,285,470 | 11/1966 | Frei et al. | 222/54 |
| 4,077,390 | 3/1973 | Stanley et al. | 126/263 |
| 4,295,517 | 10/1981 | Guex et al. | 126/263 X |
| 4,451,383 | 5/1984 | Arrhemius | 126/263 X |
| 4,512,846 | 4/1985 | Shlichta | |
| 4,519,774 | 5/1985 | Shedd | 431/267 |
| 4,580,547 | 4/1986 | Kapralis et al. | 126/263 |
| 4,696,338 | 9/1987 | Jensen et al. | 165/104.11 X |

FOREIGN PATENT DOCUMENTS

| | | | |
|---|---|---|---|
| 1519771 | 3/1969 | Fed. Rep. of Germany | |
| 2907366 | 9/1980 | Fed. Rep. of Germany | 165/10 A |
| 488611 | 3/1976 | U.S.S.R. | |
| 0987328 | 1/1983 | U.S.S.R. | 126/400 |

OTHER PUBLICATIONS

P. F. Barrett, B. R. Best, K. B. Oldham, *Thermal Energy Storage in Supersaturated Salt Solutions*, 10 Materials Chemistry and Physics 39–44 (6/1984).
P. F. Barrett & B. R. Best, *Thermal Energy Storage in Supercooled Salt Mixtures*, 12 Materials Chemistry and Physics 529–536 (7/1985).

*Primary Examiner*—Robert E. Garrett
*Assistant Examiner*—Carl D. Price
*Attorney, Agent, or Firm*—Ken Richardson

[57] ABSTRACT

A method of storing and controlling a release of latent heat of transition of a phase-change material is disclosed. The method comprises trapping a crystallite of the material between two solid objects and retaining it there under high pressure by applying a force to press the two solid objects tightly together. A crystallite of the material is exposed to a quantity of the material that is in a supercooled condition to nucleate the crystallization of the supercooled material.

21 Claims, 6 Drawing Sheets

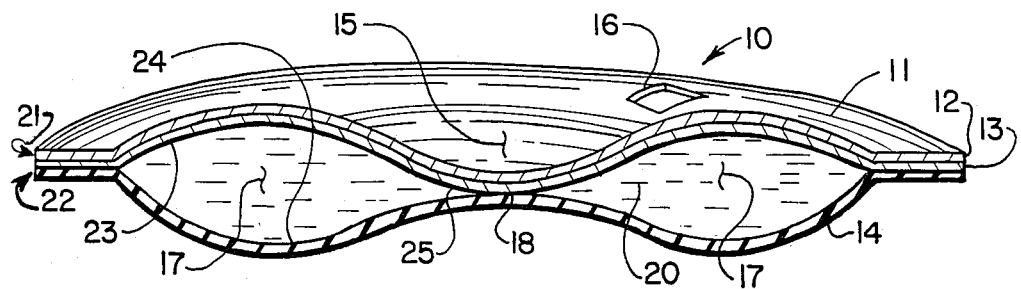
FIG. 3 (High Temp.)
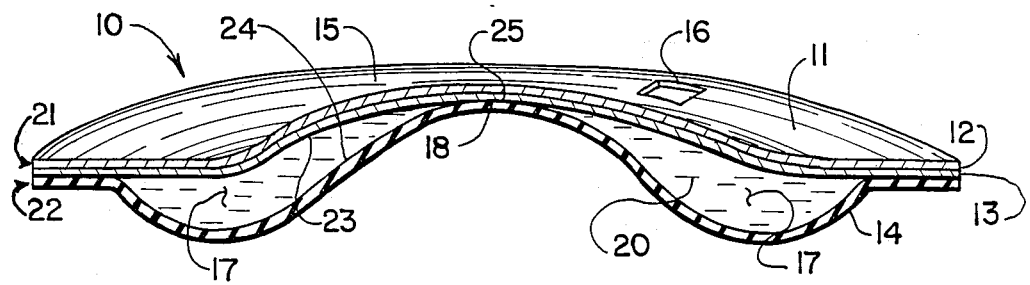
FIG. 4 (Low Temp.)

METHOD AND APPARATUS FOR NUCLEATING THE CRYSTALLIZATION OF UNDERCOOLED MATERIALS

CONTRACTUAL ORIGIN OF THE INVENTION

The United States Government has rights in this invention under Contract No. DE-AC02-83CH10093 between the U.S. Department of Energy and the Solar Energy Research Institute, a Division of Midwest Research Institute.

BACKGROUND OF THE INVENTION

1. Field of the Invention

The present invention relates generally to methods and apparatus for nucleating the crystallization of supercooled materials such as those used for phase-change thermal energy storage (e.g., salt hydrates such as sodium acetate, sodium thiosulfate, and trimethylol ethane hydrate). Such nucleation forces the supercooled material to change from its high-temperature phase to its low-temperature phase very rapidly and, in doing so, surrender its latent heat of transition. The invention relates more specifically to a method and apparatus for controlling and triggering nucleation at specific temperatures and times through manual, thermal, or electromechanical triggering.

2. Description of Prior Art

The general principles of thermal energy storage by means of phase-change materials are widely known. As materials are heated from a beginning state or phase, the solid phase for example, to the liquid phase, energy is absorbed. In the temperature range at which the material changes from one phase to another, more energy is required to raise the temperature an additional increment than to raise the temperature by the same increment when the material is not changing phase. This additional energy required at the phase change (or transition from one state to another) of the material is called the latent heat of transition.

More specifically, the heat required for the phase change from liquid to gas and is called latent heat of vaporization. The heat required for the phase change from solid to liquid and given up in the reverse phase change from liquid to solid is known as the latent heat of fusion. When a material cools, the energy absorbed at the phase-change point is normally given up. Some materials will cool well below the normal phase change temperature, but still retain the latent heat of transition and remain in the higher-temperature phase or state. For example, some materials under some circumstances may be cooled below the temperatures at which they normally change from liquid to crystalline, yet remain in the liquid state, thus still retain the latent heat of fusion. A material in this condition is said to be undercooled or supercooled. It is possible to create conditions in an undercooled material that will cause it to change very rapidly from the high-temperature phase to the low-temperature phase, thus giving up the energy stored as the latent heat of transition or fusion rapidly. The energy so surrendered may potentially be put to practical use in many ways.

A major drawback to effective use of the latent heat of transition or fusion of supercooled thermal storage materials has been the inability to control the conditions of release of the energy so that it can be accomplished reliably and predictably when desired by the user. There have been previous devices and methods developed for inducing the crystallization of undercooled or supercooled materials. For example, U.S. Patent No. 4,077,390 issued to J. Stanley, et al., utilizes a method of bending a ferrous metal strip positioned in a supercooled sodium acetate solution. Stanley et al, teach that crystallization of the supercooled solution may be caused by the flexing of the ferrous metal strip. Somewhat similarly, U.S. Patent No. 2,220,777, issued to D. Othmer, teaches the scratching or rubbing together of two pieces of metal or other materials in a sodium acetate solution in order to begin the crystallization of the solution.

U.S. Patent No. 1,384,747, issued to Eckelmann et al., crystallizes a sodium acetate solution by disturbing it with a rod or by exposing the solution to air. Likewise, U.S. Patent No. 1,385,074, issued to G. Ferguson, teaches a method of crystallizing a sodium acetate solution by piercing a seal to expose the solution to air and, then shaking the solution; and U.S. Patent No. 1,920,853, issued to R. Ferguson, also exposes sodium acetate solution to air in a valve mechanism to begin crystallization of the solution.

U.S. Patent No. 4,512,846, issued to Schlicta, teaches placing a solution of material to be crystallized in a pressure vessel and subjecting it to extremely high pressure to keep the solution in a supercritical state and then providing a seed crystal so that slow growth of a large crystal may proceed on the seed crystal.

Russian Patent No. 488,611, issued to Kurtzman, discloses apparatus that permits a crystal grower to drop a seed crystal into a supersaturated solution in order to initiate crystal growth. Besides application such as those described in the earlier patents above, where the undercooling of a material is a desired way of storing and then releasing on demand the latent heat of transition or fusion, there are also circumstances in which undercooling is an undesired effect. For example, in a process where crystallization of a material is desired to occur at a predictable temperature or at a controlled rate, the undercooling phenomenon can result in the material remaining in the liquid phase, even through it has been cooled to below its normal freezing or crystallization temperature, thus impeding or blocking the desired crystallization process. In such circumstances, an automatic, reliable means of preventing such undercooled condition would be very beneficial, but has not been available prior to this invention.

While all of the above-described prior developments were effective to various extents for particular purposes, there has remained a fundamental inability to trigger nucleation of the crystallization process at precise, predetermined times or temperatures with automatic, or at least easily controlled, trigger mechanisms.

SUMMARY OF THE INVENTION

Accordingly, it is a general object of the present invention to provide a method and apparatus for releasing the latent heat of transition of a thermal storage (phase-change) material in a reliable and consistent manner.

Further, it is a general object of the present invention to provide a method and apparatus for releasing the latent heat of transition of a thermal storage material at a predetermined temperature that can be specified or selected by the user of the present invention.

Another general object of the invention is to provide a method and apparatus for releasing the latent heat of fusion of an undercooled material at any time selected by a user.

A more specific object of the present invention is to provide a method and apparatus for releasing the latent heat of transition of a thermal storage material by the process of nucleation of a supercooled phase of the material.

Another specific object of the present invention is to provide a method and apparatus for release of the stored energy of a supercooled thermal storge material that may be entirely automatic.

It is also a specific object of the present invention is to provide a method and apparatus for release of the stored energy of a supercooled thermal storage material that may be controlled manually by the user.

A further object of the present invention is to provide a method and apparatus for storage of thermal energy during periods of excess supply of that energy, for release at a time when the thermal energy is in short supply or not present at all.

Still another specific object of the present invention is to provide a method and apparatus for triggering the crystallization of undercooled materials by introduction of seen crystals into the materials.

Yet another specific object of the present invention is to provide a method and apparatus for storing a seed crystal in a container of material in both high-temperature phase and low-temperature, undercooled phase and of releasing the seed crystal into the undercooled phase material to trigger crystallization by nucleation at precisely the time or temperature desired.

Additional objects, advantages, and novel features of the present invention shall be set forth in part in the description that follows, and in part will become apparent to persons skilled in the art upon examination of the following or may be learned by the practice of the invention. The objects and advantages of the invention may be realized and attained by means of the instrumentalities and in combinations particularly pointed out in the appended claims.

To achieve the foregoing and other objects and in accordance with the purpose of the present invention as embodied and broadly described herein, the method of the present invention may comprise the steps of preserving and isolating crystallites of a thermal storage (phase-change) material in its low-temperature phase by high-pressure clamping or squeezing the crystallite between two hard surfaces. The pressure should be intense enough to keep the crystallite from melting when heating the thermal storage material to its high-temperature phase. After allowing the material to cool again to a supercooled state, the pressure can be at least partially relieved, thereby presenting the crystallite of low-temperature phase material to the supercooled, high-temperature (liquid) phase of the material, thereby causing nucleation and chain reaction crystallization of the supercooled material with consequent surrender of its latent heat of transition.

The apparatus of this invention may comprise any hard bodies or surfaces that can be pressed together with enough pressure to trap and isolate at least one crystallite therebetween and with enough pressure to keep the crystallite from melting at temperatures higher than the phase-change temperature. For example, such apparatus can include a bistable, bimetallic trigger device wherein at temperatures above that selected by the user or designed into the device, the bimetallic portion configures itself to exert a force against a monolithic portion of the trigger, thereby trapping and preventing expansion and melting of crystals or crystallites of the thermal storage material as it is heated to a temperature above the phase-change temperature. At temperatures at or below that selected by the user, preferably at a temperature below the phase-change temperature, the bimetallic portion reconfigures itself to release enough of the pressure to present the crystallite to the supercooled material, causing nucleation and surrender of the stored energy (latent heat of transition) of the thermal storage material.

The apparatus of the present invention may also include an electromagnetically actuated, spring-loaded solenoid device to apply the force to a ball mounted on an anvil, with said ball and anvil being placed within a chamber containing the thermal storage (phase-change) medium. At temperatures above that selected by the user, the spring-loaded actuator of the solenoid exerts a force against the ball, which in turn exerts a force against the anvil, trapping and preventing expansion of crystals of the thermal storage material as it is heated from a low-temperature phase to a high-temperature phase, preserving said crystallite in the low-temperature phase. Then, at temperatures at or below that selected by the user, power is applied to the solenoid, causing retraction of the actuator, or at least release of enough of the force exerted against the ball to present the crystallite to the supercooled material, causing nucleation and surrender of the stored energy (latent heat of transition) of the thermal storage material within the chamber.

DESCRIPTION OF THE DRAWINGS

The accompanying drawings, which are incorporated in and form a part of the specification, illustrate the preferred embodiments of the present invention and together with the description serve to explain the principles of the invention.

In the drawings:

FIGS. 3-4 are cross-sectional representations of the bistable, bimetalic triggering device of FIG. 2, taken about line X—X'.

DETAILED DESCRIPTION OF THE PREFERRED EMBODIMENTS

The method and the apparatus of this invention are directed toward inducing or triggering a supercooled, phase-change thermal storage material (e.g., salt hydrates, such as sodium acetate, sodium thiosulfate, trimethylol ethane hydrates, and the like) to crystallize and thus give up its latent heat of transition by sequential formation, preservation, isolation, and introduction of a low-temperature phase seed crystal of the material at a chosen time.

Some materials, such as the salt hydrates mentioned above, that are useful for storing thermal energy also exhibit strong tendencies to remain in their high-temperature, i.e., liquid, phases when cooled below their normal phase-change, i.e., freezing or crystallizing, temperatures. Often, such undercooling (supercooling) is considered undesirable, because the crystallization and consequent release of thermal energy stored in the high-temperature (liquid) phase may occur at unpredictable times. However, the phenomenon of a very strong tendency to supercool, as exhibited by such materials as those listed above, may also be used to advantage by controlling the release of the stored energy so that it occurs on demand.

Figure 1:
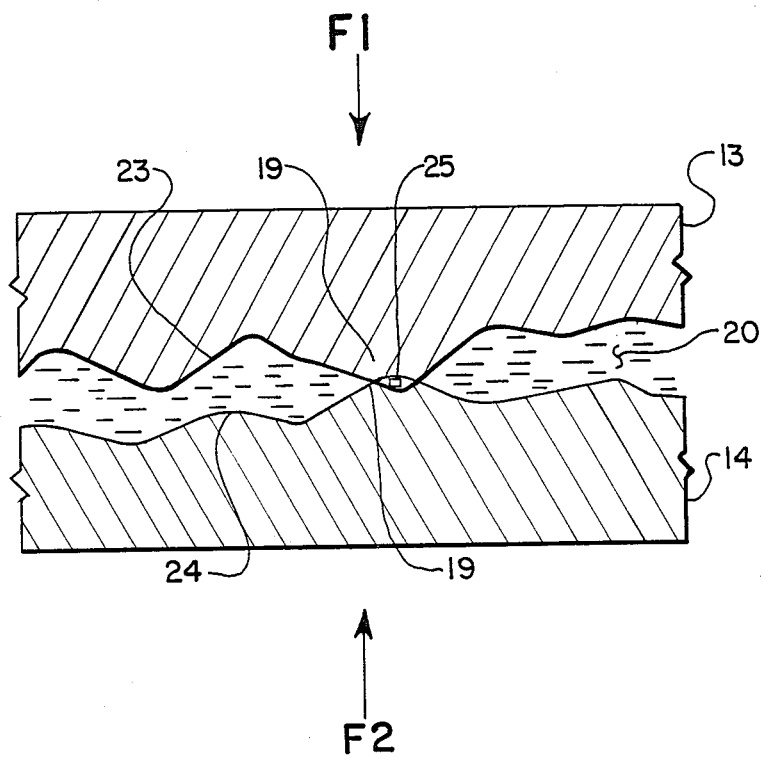
FIG. 1 is a cross-sectional diagram of the entrapment of a crystallite of phase-change material by asperites of surfaces of hard materials as they are forced together in a phase-change material medium.

FIG. 1 is helpful in illustrating the general principles of this invention as they apply to both its method and apparatus. In general, the invention provides a convenient means of preserving small seed crystals or crystallites of the low-temperature (solid or crystalline) phase of the thermal storage material 20 and a reliable means of introducing these seed crystals into the supercooled, but high-temperature (liquid) phase of the thermal storage material 20 so as to nucleate its transformation to its low-temperature (crystalline) phase and thereby release the stored latent heat of transition on demand.

According to FIG. 1, opposing forces F1, F2 may be applied to two opposing hard, solid bodies 13, 14. The respective opposing surfaces 23, 24 of these bodies 13, 14 are, on a microscopic level, comprised of a plurality of asperites 19, which are simply roughnesses of the surfaces 23, 24. The magnitudes ofthe forces F1, F2 as applied to the two opposing bodies 13, 14 produce very large pressures on the minute surface areas at the points of contact of the asperites 19, easily resulting in thousands of atmospheres of pressure.

If the thermal storage (phase-change) material 20 is positioned in its low-temperature (solid or crystalline) phase between the opposing surfaces 23, 24 of bodies 13, 14 when the forces F1, F2 are applied, then crystals 25 (also referred to as crystallites) may be trapped between the asperites 19. Application of forces F1, F2 to the opposing bodies 13, 14 will perform two functions: (1) The pressure created at the points of contact of the microscopic asperites 19 will prevent the crystal 25 from expanding as the thermal storage material is heated to and above its phase-change temperature, thereby maintaining the crystal 25 in the low-temperature phase state (according to Clapeyron's relationship from classical thermodynamics); and (2) The pressure will cause a deformation of the surface of the microscopic asperites 19, so that they encapsulate the crystals 25, isolating them from the thermal storage material 20. Thus, as the thermal storage material 20 is heated above its phase-change temperature, it will transform and exist in its high-temperature (liquid) phase in the area ouside the contact points of asperites 19. However, the crystals of the material 20 within the encapsulated area of contact of asperites 19 remain in the low-temperature (crystalline) phase. While the phase-change material 20 that is not trapped by asperites 19 is not subjected to pressure greater than ambient, the encapsulated crystals 25 are maintained under tremendous pressure.

Later, when the selected thermal storage material 20 is again cooled below its phase-change temperature, i.e., undercooled or supercooled, it maintains its high-temperature (liquid) phase, because it is slow to give up its latent heat of transition. However, when this supercooled material 20 is exposed to the seed crystal 25 of material 20 in the low-temperature phase, the seed crystal 25 nucleates the crystallization of the thermal storage material 20 by causing a chain crystallization reaction that rapidly changes all of the material 20 to its low-temperature phase, thereby giving up its latent heat of transition. The energy represented by this latent heat of transition can be applied to many useful purposes.

The exposure of the crystal 25 to the supercooled thermal storage (phase-change) material 20 can be accomplished simply by releasing the forces F1, F2 that hold the asperites 19 together, so that crystal 25 is no longer isolated. The forces F1, F2 need not be released entirely, but only enough so that the surfaces of asperites 19 separate slightly, thus allowing the supercooled thermal storage material 20 to contact the crystals 25.

Bodies 13, 14 may be selected for their hardness as measured in a variety of ways, such as Knoop or Brinnell hardness. In general, the material must be hard enough to withstand the thousands of atmospheres of pressures necessary to prevent the crystals 25 of phase-change material 20 from reverting to the high-temperature (liquid) phase as the temperature is raised, but soft enough to deform and seal around, and encapsulate, the crystal 25. Many commonly available kinds of materials, such as metals, glasses, and the like, meet this requirement.

Figure 2:
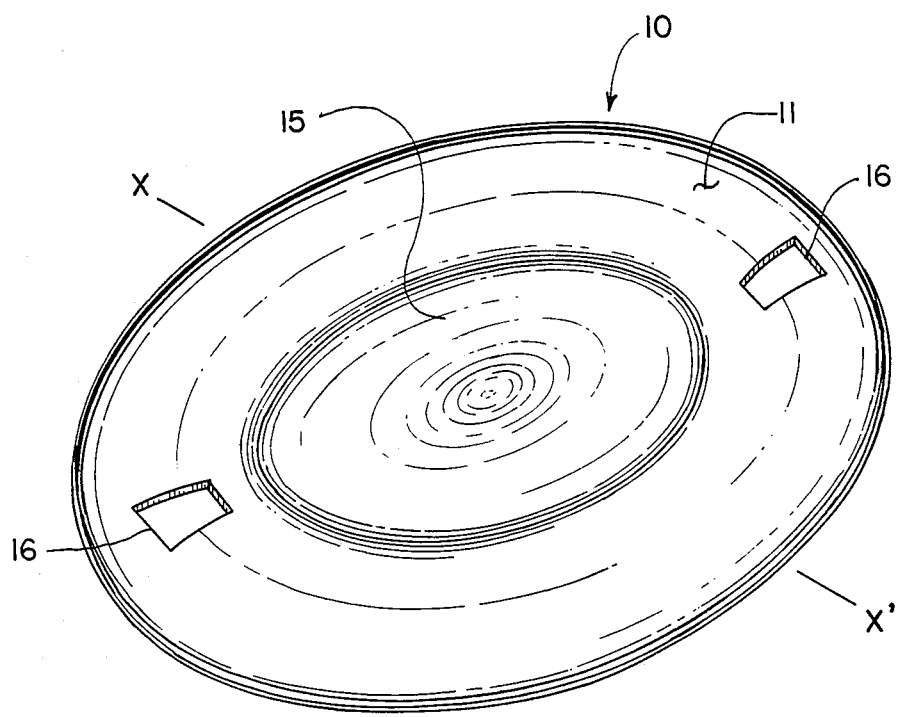
FIG. 2 is an isometric view of a bistable, bimetallic triggering device according to the first preferred embodiment of the present invention.

A first preferred embodiment of a nucleating trigger device 10, according to the principles of, and to facilitate the practice of, the present invention, is shown in FIGS. 2 through 4. The general principles of the operation of the device 10 have been described above. However, the first embodiment 10 is preferably a bistable, bimetallic trigger mechanism comprised of a bimetallic element 11 and a monolithic element 14 enclosing a chamber 17 therebetween, with an aperture 16 opening the chamber 17 to the exterior of the device 10.

Bimetallic element 11, as shown in FIGS. 3 and 4, is comprised of an upper metallic layer 12 and a lower metallic layer 13, having another coefficient of thermal expansion laminated together in a circular disk having a hollow, central depression 15. Metallic layer 12 and metallic layer 13 are selected so that the element 11 is bistable; that is, at a temperature above a design temperature T*, the element 11 stable shape is convex downward, as shown in FIG. 3. At ambient temperatures below T*, the element 11 shape is convex upward, as shown in FIG. 4. The transition in shape of element 11 from the shape shown in FIG. 3 to that shown in FIG. 4 occurs spontaneously as a "snap action" at or near design temperature T* as the ambient temperature decreases toward T*. Similarly, the transition in shape of element 11 from that shown in FIG. 4 to that shown in FIG. 3 occurs spontaneously as a "snap action" at or near design temperature T* as the ambient temperature increases toward T*.

Monolithic element 14 is also disk-shaped, and it is preferably a spring steel or similar material having a shallow central dome 18, as shown in FIGS. 3 and 4. Element 11 and element 14 are preferably attached at their respective perimeters 21 and 22 establishing a prestressed condition such that the central depression 15 of bimetallic element 11 and the central dome 18 of monolithic element 14 are always in contact. At ambient temperatures greater than design temperature T*, elements 11 and 14 are more forcefully in contact with each other at 18, as shown in FIG. 3. Conversely, at ambient temperatures below design temperature T*, elements 11 and 14 are less forcefully in contact with each other at 18, as shown in FIG. 4.

Aperture 16 is provided in bimetallic element 11 to allow the phase-change material 20 into chamber 17. It should be understood that the aperture 16 could also be provided in monolithic element 14 as well.

In operation, a bimetallic trigger mechanism 10 that is above temperature T* (and is therefore in the shape shown in FIG. 3), containing crystals of phase-change material 20, is placed in a container (not shown) having phase-change thermal storage material 20 that is in its high-temperature (liquid) phase heated above its phase change temperature. The container may be of any shape and may be adapted to a wide variety of purposes requiring the application or transfer of heat. Design temperature T* of the bimetallic trigger 10 is selected to be below the phase-change temperature of material 20. The high-temperature (liquid) phase thermal storage material 20 in the container enters chamber 17 of trigger 10 through apertures 16. The phase-change material 20 is then allowed to cool quiescently below its phase-change temperature, where it becomes undercooled or supercooled. As the ambient temperature of the material 20 decreases further and approaches design temperature T*, trigger mechanism 10 snaps to the shape shown in FIG. 4, thereby releasing some of the pressure on crystals 25 and exposing crystals 25 to the surrounding supercooled phase-change material 20. Crystals 25 serve to nucleate the supercooled phase-change material 20, thereby triggering a chain crystallization reaction and causing the material 20 to change abruptly to the low-temperature phase and thereby to surrender its latent heat of transition. When the phase-change material 20 is once again heated, before material 20 reaches its phase change temperature, trigger device 10 (at T*) will again snap into the shape of FIG. 3, sealing crystals 25 from phase-change material 20 at the pressure point 18. Phase-change material 20 can then be heated above its phase-change temperature and assume the high-temperature (liquid) phase while the crystals 25 are encapsulated and preserved at pressure point 18. When the heat source is removed, the material 20 will once again supercool, and the cycle will repeat indefinitely.

Operation of trigger device 10 may be fully automatic, based upon ambient temperature change. Where it is used to prevent unwanted undercooling, the design temperature T* can be just below the phase-change temperature of the liquid. Then, every time the material 20 is cooled to that temperature, the trigger device 10 will actuate automatically and nucleate the crystallization. On the other hand, where storage and release of heat is the objective, the design temperature T* can be even lower to trigger crystallization and consequent heat of transition release at the desired ambient temperature.

Figure 5:
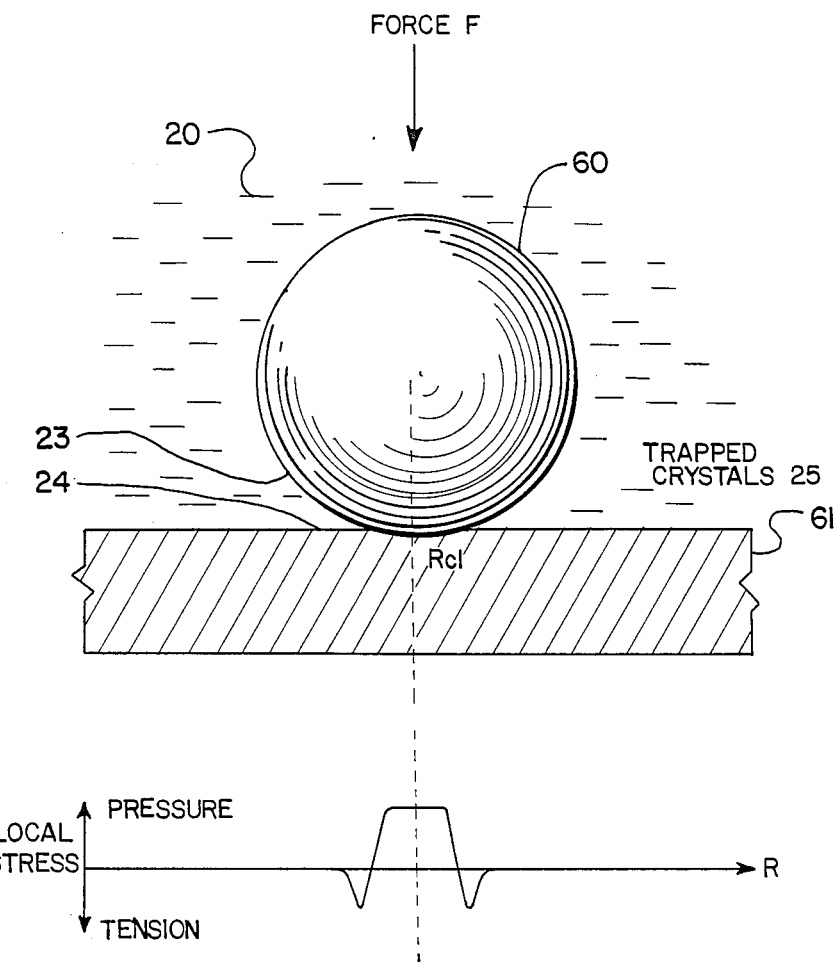
FIG. 5 is a diagrammatic representation of the forces exerted on the ball and anvil portion of the second preferred embodiment according to the present invention.
Figure 6:
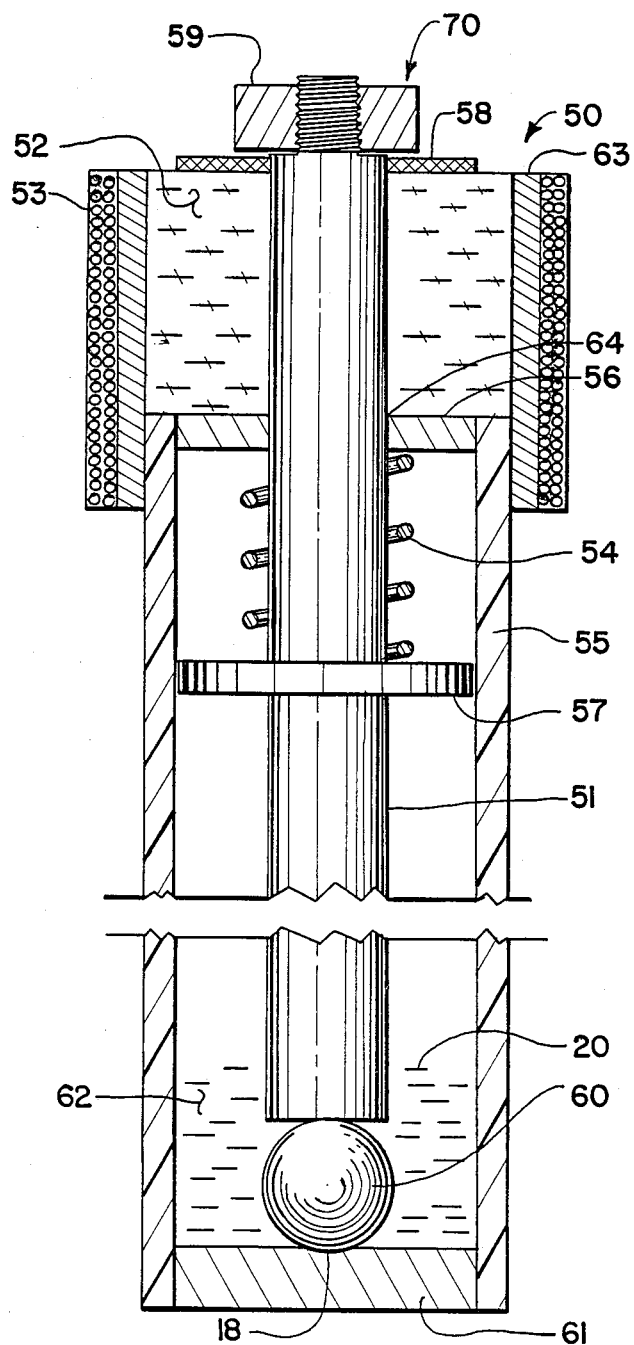
FIG. 6 is a cross-sectional view of the solenoid-actuated ball and anvil triggering device of the second preferred embodiment of the present invention.
Figure 7:
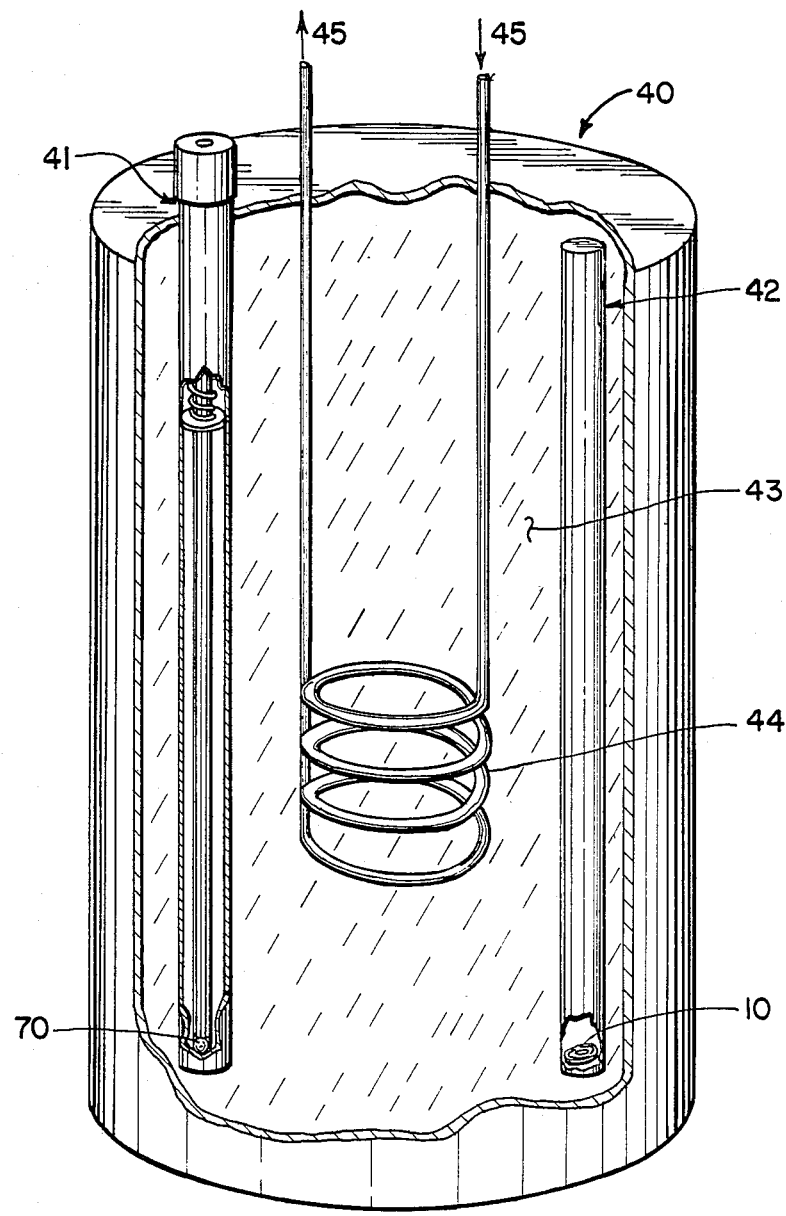
FIG. 7 is a cutaway view of the triggering device of the second preferred embodiment installed in a thermal storage tank.

A second preferred embodiment of the invention is shown in FIGS. 5-7. A hard ball 60 and a hard anvil 61 are provided for immersion in a phase-change, thermal storage material 20 according to FIG. 5. When a force F is exerted on ball 60, ball 60 is driven into anvil 61. Crystals 25 are trapped and sealed under pressure where ball 60 contacts anvil 61. When phase-change material 20 is heated past its phase change temperature, it assumes a high-temperature phase (liquid, for example). The trapped crystals 25 are maintained in the low-temperature phase, because the expansion necessary for changing to the high-temperature phase is prevented by the pressure of ball 60 against anvil 61. A chart of the stress as reflected on the surface 24 of anvil 61 is provided in FIG. 5.

When the heat source is removed, phase-change material 20 will supercool, maintaining its high-temperature phase although cooling below its phase-change temperature. When the force F is partially released from ball 60, crystals 25 of the phase-change material 20 are exposed to the high-temperature phase of material 20. This exposure nucleates the high-temperature (liquid) phase of material 20, causing chain reaction crystallization and shift to the low-temperature phase immediately, thereby causing phase-change material 20 to surrender its latent heat of transition.

FIG. 6 illustrates a solenoid-actuated nucleating trigger 70 that uses the ball 60 and anvil 61 principle as explained above. A conventional, solenoid 50 is provided. Solenoid 50 comprises an actuator 51, magnet core 52, windings 53, insulators 63, loading spring 54. Load plate 57 is attached to actuator 51. An adjustment nut 59 is provided. A tube 55, having as its bottom portion anvil 61, provides a chamber 62 for containing phase-change material 20, ball 60, and insertion of actuator rod 51. Top plate 56 of tube 55 has an aperture 64 through which actuator 51 is inserted and allowed to pass freely. Load spring 54 presses against top plate 56 and load plate 57, exerting sufficient force on ball 60 by means of actuator 51 to provide pressure for maintaining and sealing crystals 25 as explained above. Adjustment nut 59 may be used to achieve the proper pressure exerted on ball 60.

When power is applied to windings 53, the electromagnet 52 decreases the force applied by load spring 54 on actuator 51, unsealing crystals 25 and exposing them to the supercooled phase-change material 20, as described above. The phase-change material then assumes its low-temperature phase, surrendering its latent heat of transition. The solenoid-actuated nucleating trigger device 70 may be actuated manually, thermally, by time, or other means, depending on the choice of conventional controls (not shown) used to apply or interrupt the application of power to the solenoid 50. Chamber 62 may be used to contain all of the phase-change material 20 in a given design, or may be equipped with apertures (not shown) to admit phase-change material 20 from a larger container.

FIG. 7 is illustrative of one of many applications for the release of the latent heat of transition as explained in the description of the embodiments and method of the nucleating thermal storage device of the present invention. Thermal storage tank 40 contains chambers 41 and 42, and a thermal storage medium 43, which might be (for example) water. In this application, thermal storage tank 40 may be the hot water tank component of a solar hot water system. Chambers 41 and 42 each contain a phase-change thermal storage material 20, such as sodium acetate, sodium thiosulfate, trimethylol ethane hydrate, or the like. For purposes of illustration, chamber 41 would correspond to the tube portion 55 and chamber portion 62 of the solenoid actuated nucleating trigger device 70 of FIG. 6. Solenoid mechanism 50 of FIG. 6 is mounted atop chamber 41 and preferably external to storage tank 40 of FIG. 7. Again for purposes of illustration, chamber 42 of FIG. 7 also contains a trigger mechanism 10 such as described as the first preferred embodiment.

A thermal transfer medium 45 collects energy from a solar collector or other source (not shown) and transfers that energy to the storage medium 43 by means of a heat exchanger 44. As the storage medium 43 heats while the outside energy source is available, it also heats the phase-change material 20 in chambers 41 and 42 so that the high-temperature phase of material 20 is reached. Trigger mechanism 10 or 70 functions as described earlier to preserve crystals for nucleating the phase-change material 20. When the outside energy source is removed (for example, by the sun setting), the storage medium 43 and phase-change material 20 cool. The phase-change material will supercool as described above. Upon arrival at the desired temperature T*, trigger 10 or 70 will actuate, causing the supercooled phase-change material 20 in chambers 41 and 42 to give up its latent heat of transition as previously described. Storage medium 43 absorbs the energy thus given up by the phase-change material, increasing its temperature.

In this fashion, the energy stored during periods when an external energy source is plentiful is released to maintain the temperature of water, for example, during periods when the external energy source is not available.

It should be understood that storage tanks 40 may be built with multiple chambers 41 or chambers 42. The activation of the triggering devices 10 or 70 may be initiated at different times for each individual chamber, so that only one chamber at a time releases its stored energy. In this way, the desired temperature of the storage medium 43 may be maintained over a longer period of time.

The triggering devices described in the first and second preferred embodiments may also be utilized in a wide range of applications in addition to that described in FIG. 7. Examples include hand-warmers, warming pads for medical applications, food warmers, automotive battery or engine warmers, automotive seat warmers, hot tub heat recovery systems, and the like.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalence may be resorted to falling within the scope of the invention as defined by the claims which follow.

The embodiments of the invention in which an exclusive property or privilege is claimed are defined as follows:

1. The method of controlling the release of latent heat of transition of a supercooled, phase-change material, comprising:
    trapping a crystallite of the material between two solid objects and retaining it there by pressing said objects together with enough force to create sufficient pressure to keep the crystallite isolated between the two solid objects when it is immersed in the phase-change material and to keep it from melting;
    exposing said crystallite to said supercooled, phase-change material by releasing said pressure and allowing said supercooled, phase-change material to contact said crystallite.

2. The method of storing and controlling the release of latent heat of transition of a phase-change material, comprising the steps of:
    trapping a crystallite of the material between two solid objects and retaining it there by applying a force to press the two solid objects tightly together, said force providing a sufficiently intense pressure over a microscopic area where the crystallite is trapped to prevent the crystallite from melting at temperatures above the phase-change temperature of the material;
    supercooling a quantity of the material; and
    exposing the crystallite of the material to the supercooled material by relieving the force pressing the two solid objects together to nucleate the crystallization of the supercooled material.

3. The method of claim 2, includng the step of pressing said two solid objects together with enough force to isolate said crystallite from the quantity of the material that is not trapped by said intense pressure between said two objects.

4. The method of claim 3, including the steps of trapping said crystallite between said objects when said material is below the phase-change temperature of the material and crystallized;
    pressing said objects together with enough force to provide a sufficiently intense pressure over a microscopic area where the crystallite is trapped to prevent the crystallite from melting at ambient temperatures higher than the phase-change temperature of the material and to isolate said crystallite from the rest of the material;
    raising the ambient temperature of the material to a temperature above the phase-change temperature and allowing it to remain at such raised temperature for a sufficient period of time to melt the material, thereby acquiring latent heat of transition in the material;
    lowering the ambient temperature of the material to a temperature below the phase-change temperature so that the material goes into a supercooled state;
    reducing the force pressing said objects together enough to at least partially reduce the pressure on the trapped crystallite enough to expose the trapped crystallite to the supercooled material thereby nucleating the crystallization of the supercooled material.

5. The method of claim 4, including the step of initiating the reduction of said pressing force when said ambient temperature of said supercooled material reaches a predetermined temperature below the phase-change temperature.

6. The method of claim 2, including the step of applying said force with a spring device.

7. The method of claim 6, including the steps of applying said force with a temperature-sensitive spring device that applies a greater force at higher temperatures and a lesser force at lower temperatures.

8. The method of claim 3, including the step of applying sufficient pressure to partially deform said microscopic area around said crystallite to isolate said crystallite in said deformed area under sufficient pressure to keep the crystallite in crystal form when the ambient temperature is raised above the phase-change temperature.

9. Apparatus for nucleating the crystallization of a supercooled phase-change material, comprising:
    trapping means positioned in said material for isolating and retaining a crystallite of said material under sufficiently intense pressure to prevent it from melting at ambient temperatures above the phase-change temperature of the material and in such a manner as to isolate the crystallite from the rest of the material;

pressure application means as a part of said trapping means for applying the required pressure; and pressure release means as a part of said pressure application means for at least partially releasing the pressure on said crystallite.

10. The apparatus of claim 9, wherein said pressure release means is automatically actuateable under predetermined conditions.

11. The apparatus of claim 10, wherein said pressure release means is automatically actuateable by a predetermined temperature condition.

12. The apparatus of claim 11, wherein said pressure release means is automatically actuateable by a predetermined ambient temperature of said material under the phase-change temperature of the material.

13. The apparatus of claim 9, wherein said trapping means includes two substantially solid bodies having adjacent microscopic surface areas positioned in closely spaced-apart relation to each other for trapping a crystallite of said material therebetween.

14. The apparatus of claim 13, wherein said solid bodies are hard enough and said pressure application means is strong enough to apply sufficient pressure on said crystallite to prevent it from melting at temperatures above the phase-change temperature.

15. The apparatus of claim 14, wherein said pressure application means is strong enough to apply a sufficient pressure to said solid bodies to cause said microscopic surface areas to deform around the trapped crystallite and thereby isolate the crystallite from the rest of the material.

16. The apparatus of claim 9, wherein one of said solid bodies is a monolithic tensioned spring plate having a convex bulge therein, the other of said solid bodies is a bistable, bimetallic plate having a bulge that is in contact with the convex bulge in said monolithic plate, which bulge in said bimetallic plate in a first position extends in a direction concavely away from said convex bulge in said monolithic plate at lower temperatures so that the pressure between said bodies is less at lower temperatures and which in a second position extends in a direction convexly toward said convex bulge in said monolithic plate at higher temperatures so that the pressure between said bodies is more at higher temperatures, there being a snap temperature where said bulge in said bimetallic plate becomes unstable and snaps from said first position to said second position and from said second position to said first position in response to ambient temperature change, said snap temperature being below the phase-change temperature of said material, said pressure application means being said monolithic and said bimetallic plates biased in contact with each other, and said pressure releasse means being said bimetallic plate at said snap temperature where it snaps from said second to said first position.

17. The apparatus of claim 9, wherein one of said bodies has a curved surface, and wherein one of said bodies is biased toward, and in contact with, the other.

18. The apparatus of claim 17, wherein said pressure removing means includes an electrically actuated solenoid connected to said body that is biased toward the other, and said solenoid is actuateable to at least partially counteract said bias.

19. In heat storage and releasing apparatus having a supercoolable, phase-change material in a container for storing latent heat of transition when said material is melted and for giving up the latent heat of fusion by chain reaction rapid crystallization in a supercooled condition, the improvement comprising:

two adjacent hard bodies immersed in said material, each of said hard bodies having at least one microscopic surface area adjacent the microscopic surface area of the other body adapted for trapping at least one crystallite of said material therebetween;

pressure application means for biasing said bodies against each other with sufficient pressure applied at said microscopic areas to prevent a crystallite of the material trapped therebetween from melting at temperatures higher than the phase-change temperature of the material and with sufficient pressure to isolate said crystallite from the remaining material in the container; and pressure relieving means for causing said pressure application means to at least partially release the pressure on said crystallite to expose the crystallite to the material in the container when the material in the container is in a supercooled condition.

20. The apparatus of claim 19, wherein said pressure relieving means includes remote actuation means for actuating said pressure relieving means on demand by a user.

21. The apparatus of claim 19, wherein said pressure relieving means includes automatic actuation means for actuating said pressure relieving means automatically upon the occurrence of a predetermined condition.

* * * * *